United States Patent
Kadur et al.

(10) Patent No.: US 9,973,507 B2
(45) Date of Patent: May 15, 2018

(54) CAPTIVE PORTAL HAVING DYNAMIC CONTEXT-BASED WHITELISTING

(71) Applicant: Extreme Networks, Inc., San Jose, CA (US)

(72) Inventors: Manish Manjunath Kadur, Bangalore (IN); Atul Prabhu, Bangalore (IN)

(73) Assignee: Extreme Networks, Inc., San Jose, CA (US)

( * ) Notice: Subject to any disclaimer, the term of this patent is extended or adjusted under 35 U.S.C. 154(b) by 163 days.

(21) Appl. No.: 15/040,499

(22) Filed: Feb. 10, 2016

(65) Prior Publication Data
US 2017/0230373 A1 Aug. 10, 2017

(51) Int. Cl.
H04L 29/06 (2006.01)
H04L 29/08 (2006.01)
H04L 29/12 (2006.01)

(52) U.S. Cl.
CPC ........ H04L 63/101 (2013.01); H04L 61/1511 (2013.01); H04L 61/2007 (2013.01); H04L 61/6009 (2013.01); H04L 63/0876 (2013.01); H04L 67/02 (2013.01)

(58) Field of Classification Search
CPC ............... H04L 63/101; H04L 63/0876; H04L 61/1511; H04L 61/2007; H04L 67/02; H04L 61/6009
See application file for complete search history.

(56) References Cited

U.S. PATENT DOCUMENTS

| | | | | |
|---|---|---|---|---|
| 7,502,835 B1* | 3/2009 | Cheng | ..................... | H04L 63/08 709/217 |
| 8,214,899 B2* | 7/2012 | Chien | .................... | G06F 21/552 726/23 |
| 8,856,239 B1* | 10/2014 | Oliver | ............... | H04L 29/12066 709/205 |
| 2002/0156838 A1* | 10/2002 | Batke | .................... | H04L 67/125 709/203 |
| 2005/0251684 A1* | 11/2005 | Mitsuoka | ............ | H04L 67/1097 713/182 |
| 2006/0155981 A1* | 7/2006 | Mizutani | ............... | H04L 9/0822 713/150 |
| 2014/0298443 A1* | 10/2014 | Amaro | .................... | H04L 63/08 726/9 |
| 2016/0080319 A1* | 3/2016 | Steele | ................. | H04L 61/2517 709/228 |
| 2016/0094557 A1* | 3/2016 | Kadur | .................... | H04L 63/083 726/3 |
| 2016/0156719 A1* | 6/2016 | Mobarak | ............... | H04L 67/141 726/4 |

* cited by examiner

*Primary Examiner* — Sarah Su
(74) *Attorney, Agent, or Firm* — Haley Guiliano LLP

(57) ABSTRACT

Methods, systems and computer readable media for a captive portal having dynamic, context-based whitelisting are described.

15 Claims, 5 Drawing Sheets

| Client Request Table (202) | |
|---|---|
| Client IP (204) | Client Port (206) |
| 192.168.10.1 | 54890 |
| ⋮ | ⋮ |
| 20.134.40.2 | 23458 |

208 → (first data row)
210 → (last data row)

FIG. 2

Domain Whitelist Table (302)

| Domain (304) | IP (306) |
|---|---|
| Facebook.com | 31.13.74.1 |
| ⋮ | |
| Google+ | 10.30.45.1 |

308 → (Facebook.com row)
310 → (Google+ row)

FIG. 3

CAPTIVE PORTAL HAVING DYNAMIC CONTEXT-BASED WHITELISTING

TECHNICAL FIELD

Embodiments relate generally to computer networks, and more particularly, to methods, systems and computer readable media for a captive portal having dynamic, context-based whitelisting.

BACKGROUND

Some captive portals use the concept of whitelisting for allowing access to given host or domain before user authentication. Access to hosts or domains in the whitelist is allowed even for unauthenticated/unauthorized users In many deployments, the whitelist is populated statically and is a whitelist that is applicable to all users. A common use case for this conventional whitelisting is to provide support for social media sites. Many solutions now allow users to login using their social media credentials and in order facilitate access the social media login module, these domains have to be added to the whitelist by an administrator, for example. The goal of this whitelisting is to allow access to the login module of the social media sites on the whitelist and not to allow general access to the social media sites per se.

However, when such a whitelist is populated using the social media domains, it may be possible for a savvy user to gain unauthorized access to these sites even before authentication.

Embodiments were conceived in light of the above mentioned needs, problems and/or limitations, among other things.

SUMMARY

One or more embodiments can include methods, systems and computer readable media for a captive portal having dynamic, context-based whitelisting. In some implementations, a method can include receiving, from a user device, a first request to access a website, and redirecting the user device to a captive portal. The method can also include receiving a selection from the user device via the captive portal to access a login page of the web site, and creating a client request table corresponding exclusively to the user device. The method can further include creating a domain whitelist table corresponding exclusively to the user device, and adding a client request table entry to the client request table corresponding exclusively to the user device, the client request table entry including an Internet protocol (IP) address and a port number of the user device.

The method can also include adding a domain whitelist table entry to the domain whitelist table corresponding exclusively to the user device, the domain whitelist table entry including a domain name of the website and a DNS resolved IP address for the domain name, and permitting the client device to access the login page of the website based on the domain whitelist table entry. The method can further include receiving a second request from the user device to access the website, the second request including an IP address and a port number, and searching for the IP address and port number combination of the second request in the client request table corresponding exclusively to the user device.

The method can also include when the IP address and port number combination of the second request do not match an existing combination in the client request table, redirecting the user device to the captive portal, and when the IP address and port number combination of the second request match a combination existing in the client request table, permitting the user device to access the website via the second request. The method can further include granting access to a network when the user device completes an authentication process with the website.

The website can include a social media website. The method can also include deleting the client request table and the domain whitelist table when the user device completes an authentication process with the website. The method can further include, when a selection to login to a second website is received from the user device, adding an entry for the second website to the domain whitelist table corresponding exclusively to the user device.

Some implementations can include a system comprising one or more processors coupled to a nontransitory computer readable medium having stored thereon on software instructions that, when executed by the one or more processors, cause to perform operations. The operations can include receiving, from a user device, a first request to access a website, and redirecting the user device to a captive portal. The operations can also include receiving a selection from the user device via the captive portal to access a login page of the website, and creating a client request table corresponding exclusively to the user device. The operations can further include creating a domain whitelist table corresponding exclusively to the user device, and adding a client request table entry to the client request table corresponding exclusively to the user device, the client request table entry including an Internet protocol (IP) address and a port number of the user device.

The operations can also include adding a domain whitelist table entry to the domain whitelist table corresponding exclusively to the user device, the domain whitelist table entry including a domain name of the website and a DNS resolved IP address for the domain name, and permitting the client device to access the login page of the website based on the domain whitelist table entry. The operations can further include receiving a second request from the user device to access the website, the second request including an IP address and a port number, and searching for the IP address and port number combination of the second request in the client request table corresponding exclusively to the user device.

The operations can also include, when the IP address and port number combination of the second request do not match an existing combination in the client request table, redirecting the user device to the captive portal, and, when the IP address and port number combination of the second request match a combination existing in the client request table, permitting the user device to access the website via the second request. The operations can further include granting access to a network when the user device completes an authentication process with the website.

The website can include a social media website. The operations can also include deleting the client request table and the domain whitelist table when the user device completes an authentication process with the website. The operations can further include, when a selection to login to a second website is received from the user device, adding an entry for the second website to the domain whitelist table corresponding exclusively to the user device.

Some implementations can include a nontransitory computer readable medium having stored thereon software instructions that, when executed by one or more processors, cause the one or more processors to perform operations. The operations can include receiving, from a user device, a first request to access a website, and redirecting the user device to a captive portal. The operations can also include receiving a selection from the user device via the captive portal to access a login page of the website, and creating a client request table corresponding exclusively to the user device. The operations can further include creating a domain whitelist table corresponding exclusively to the user device, and adding a client request table entry to the client request table corresponding exclusively to the user device, the client request table entry including an Internet protocol (IP) address and a port number of the user device.

The operations can also include adding a domain whitelist table entry to the domain whitelist table corresponding exclusively to the user device, the domain whitelist table entry including a domain name of the website and a DNS resolved IP address for the domain name, and permitting the client device to access the login page of the website based on the domain whitelist table entry. The operations can further include receiving a second request from the user device to access the website, the second request including an IP address and a port number, and searching for the IP address and port number combination of the second request in the client request table corresponding exclusively to the user device.

The operations can also include, when the IP address and port number combination of the second request do not match an existing combination in the client request table, redirecting the user device to the captive portal, and, when the IP address and port number combination of the second request match a combination existing in the client request table, permitting the user device to access the website via the second request. The operations can further include granting access to a network when the user device completes an authentication process with the website.

The website can include a social media website. The operations can also include deleting the client request table and the domain whitelist table when the user device completes an authentication process with the website. The operations can further include, when a selection to login to a second website is received from the user device, adding an entry for the second website to the domain whitelist table corresponding exclusively to the user device.

BRIEF DESCRIPTION OF THE DRAWINGS

FIG. 2 is a diagram of an example client request table in accordance with at least one implementation.

FIG. 3 is a diagram of an example domain whitelist table in accordance with at least one implementation.

DETAILED DESCRIPTION

Figure 1:
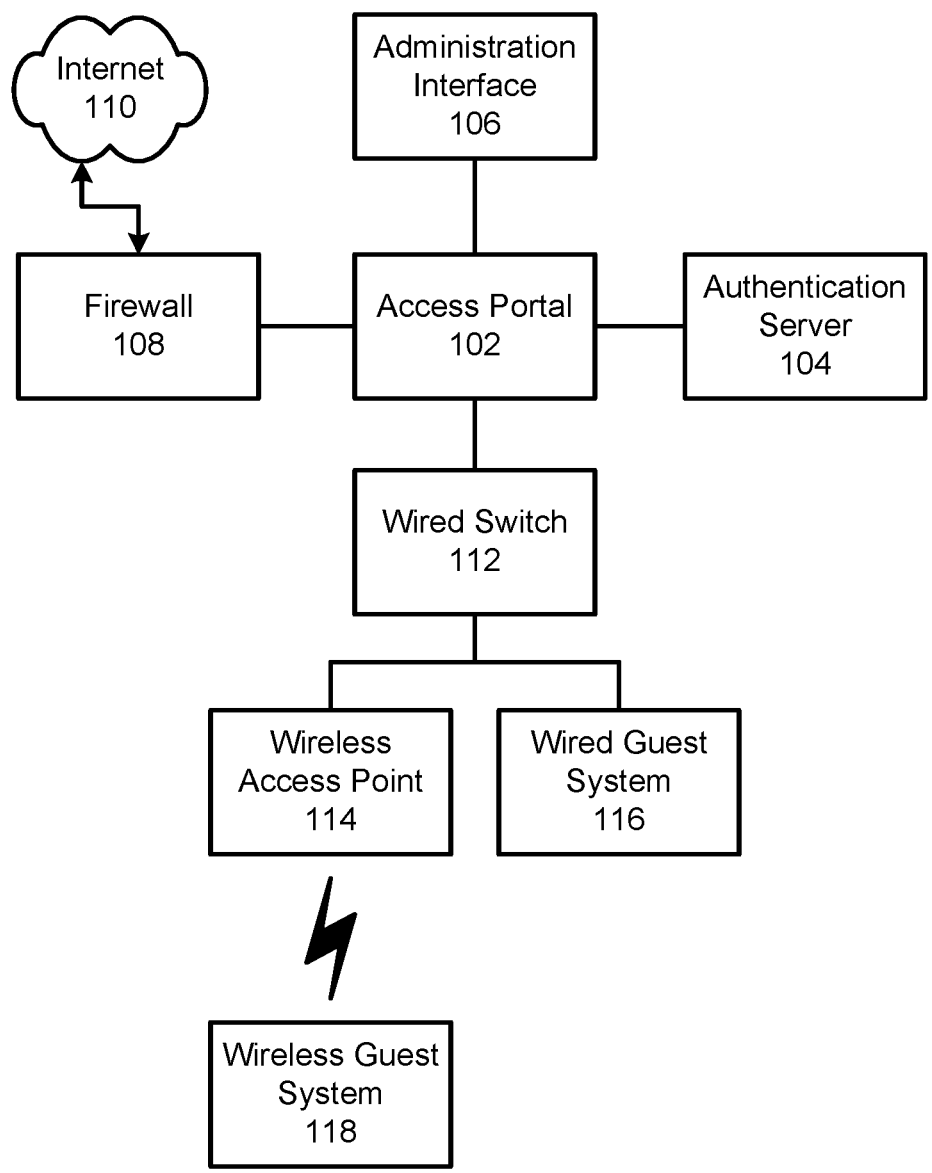
FIG. 1 is a diagram of an example captive portal environment in accordance with at least one implementation.

In general, a captive portal with dynamic context-based whitelisting can be applied to two common scenarios: user initiated requests and device initiated requests. In the user initiated request scenario, a user learns about access to a social media site as a part of social media authentication. In some conventional captive portals, the user can open another browser window (or a tab in the same browser) and connects to the social media site and gains uninterrupted access pre authentication.

In the device initiated request scenario, a client device requests access to a social media site in the background. The client device may be connected to a network where a social media site is whitelisted. Applications installed on the device (for instance the Facebook App) may automatically start sending requests to social media sites and thus gain uninterrupted access pre authentication.

In general, in some implementations, a client request table is maintained for each unauthenticated client that contains a mapping between the client IP (e.g., the IP address of the client or user device initiating the request) and client port (e.g., the source port on the client or user device that initiated the request). A domain whitelist table is maintained that includes the IP address of one or more domains to be whitelisted for the user device based on the domains the user device seeks access to for authentication purposes. The domain whitelist table contains one or more pairs including a domain (e.g., domain name of social media site) and IP (DNS resolved IP address(es) of social media site). The domain whitelist table is periodically refreshed to maintain up-to-date IP addresses for the social media sites. The client request table and the domain whitelist table can be created in response to a request from a user device (or client) and the client request table and the domain whitelist table can correspond exclusively to the user device. For example, a separate client request table and domain whitelist table may created for each user device (or unauthenticated client) that attempts to access the network or a website thought the captive portal.

In some implementations, a firewall rule is generated in a captive portal that includes the following functions:

"Any request from a combination of IP and Port listed in the client request table corresponding exclusively to the user device to an IP address in the domain whitelist table corresponding exclusively to the user device is allowed"; and "Any other request is redirected to the captive portal login page"

The entries in the client request table are populated dynamically only when the user device initiates the process of social media login, for example by clicking on the login button in the portal login page. This connection can be considered as the authentication flow for social media.

When the social media site login is initiated (e.g., based on click of the social media site login button), an entry (client IP and connecting port) is made in the client request table for the corresponding user device. The access to the social media login page is now allowed.

If the social media login button was not pressed then no entry is made in the client request table and hence the first rule stated above is not evaluated. If the user now tries to access the Facebook site, for example, the request is redirected to the captive portal login page even though internally Facebook is whitelisted.

If at any point when the IP address of client exists in the client request table and another request to the social media site is detected, the port which initiated the request (e.g., source port) is identified.

If the request is originating from the same client but from another port (e.g., which might happen when another tab in the browser is opened or when a new browser is opened or a request comes from a mobile app) it is implied that the second request we encountered now is a request initiated for purpose other than authentication. In such a case, the request is redirected to the captive portal login screen.

FIG. 1 is a diagram of an example captive portal environment 100 in accordance with at least one implementation. The environment 100 includes an access portal 102 (or captive portal system), an authentication server 104, an administration interface 106, a firewall 108, a network (e.g., the Internet) 110, a wired switch 112, a wireless access point 114, a wired guest system, and a wireless guest system 118.

In operation, the wireless guest system 118 and/or wired guest system 116 (e.g., user device) may seek access to the network (e.g., the Internet 110 or other network connected to the access portal 102). The access portal 102 can provide a captive portal. A captive portal is a software application that works in connection with a firewall distribution to force an HTTP client on a network, (e.g. on 116 or 118) to interact with a special web page (usually for authentication purposes) before granting access to the network. For user authentication, the captive portal communicates with an authentication server 104 (e.g., a RADIUS Server such as the Ignition Server by Avaya, Inc.).

When a client connects to a network protected by some conventional captive portals, any http request made may be intercepted and redirected to a login page. In most cases, subsequent access is given only after the user has been authenticated. However, there are occasions where access to certain sites need to be given (e.g., for advertising, corporate sponsorship, etc.) to the user even before authentication. A whitelist allows administrators to define a set of hosts, which can be accessed by the user even before the initial authentication is complete.

A user authenticating to their account on a social media site can serve as a kind of authentication to gain network access. Accordingly, in certain cases, e.g., for authentication using a social media login, a few domains need to be whitelisted so that users can access these social media sites as a part of authentication process. Firewall rules can be generated such that any requests made to these particular list on domain on the whitelist are not intercepted and do not require any authentication.

In order to support a social media login, one or more social media domains are added to the whitelist. Request to domains on the whitelist are not intercepted by captive portal, users will be able to access these domains without being intercepted or without the need to login However, the goal of this action may be to only allow access to the login flow of the social media sites and not to provide general access to the social media sites without user authentication. Firewall rules typically cannot determine if the request made to whitelisted domain is in the context of authentication process or otherwise and hence may provide a blanket operation to allow all requests.

Also, in some conventional systems, the task of whitelisting domains is static in nature and not associated with any context. For example, if a conventional captive portal system is configured to permit login using Facebook, then the domain "www.facebook.com" needs to be added to the whitelist so that the initial Facebook login page can be reached by a user and the user can provide authentication credentials (e.g., user name and password). However, by adding this domain to a whitelist of a conventional captive portal system, the user may be able to access the entire Facebook site and not just the login module, as was originally intended.

Some implementations of the disclosed captive portal system having dynamic context-based whitelisting were conceived in light of the above-mentioned problems and limitations. Some implementations may provide an advantage of permitting a user to access only a login portion of a whitelisted domain using techniques described in detail below. Thus, the system may get the advantage of providing a captive portal with social media login authentication, for example, without the risks associated with conventional static whitelisting.

In order to provide dynamic context-based whitelisting, an implementation may include a client request table and a domain whitelist table corresponding exclusively to the user device. The client request table and a domain whitelist table may be created to correspond exclusively to the user device when the user device first attempts to access a website for authentication. The client request table and a domain whitelist table corresponding exclusively to the user device can be updated when the user device seeks to access a different website or when a domain IP address changes. The client request table and a domain whitelist table may be deleted once the user device is authenticated or after another condition (e.g., expiration of given period of time, etc.). By creating, modifying and deleting the client request table and domain whitelist table for each user device seeking access to the network, the system can reduce or prevent unnecessary expansion of a whitelist table. Examples of the client request table and a domain whitelist table are shown in FIGS. 2 and 3, respectively.

FIG. 2 is a diagram of an example client request table 202 in accordance with at least one implementation. The client request table 202 includes one or more entries 208, 210 having a client IP field 204 and a client port field 206. Optionally, the client request table could include other fields, such as MAC address. The client IP field 204 contains the IP address of the client initiating the request. The client port field 206 contains the source port on the client device that initiated the request.

FIG. 3 is a diagram of an example domain whitelist table 302 in accordance with at least one implementation. The domain whitelist table 302 includes one or more entries 308, 310 each having a domain field 304 and an IP field 306. The domain field 304 contains the domain name of a website (e.g., a social media site). The IP field 306 contains the DNS resolved IP address(es) of the website. The IP fields 306 may be periodically refreshed (e.g., daily, weekly, or monthly, etc.) to maintain up-to-date IP address for the domains in the table 302.

Some implementations can include a firewall rule generated in the captive portal that includes the following logic:

1) "Any request from a combination of IP and Port listed in the client request table corresponding exclusively to the user device to an IP address in the domain whitelist table corresponding exclusively to the user device is allowed"; and 2) "Any other request is redirected to the captive portal login page"

Figure 4:
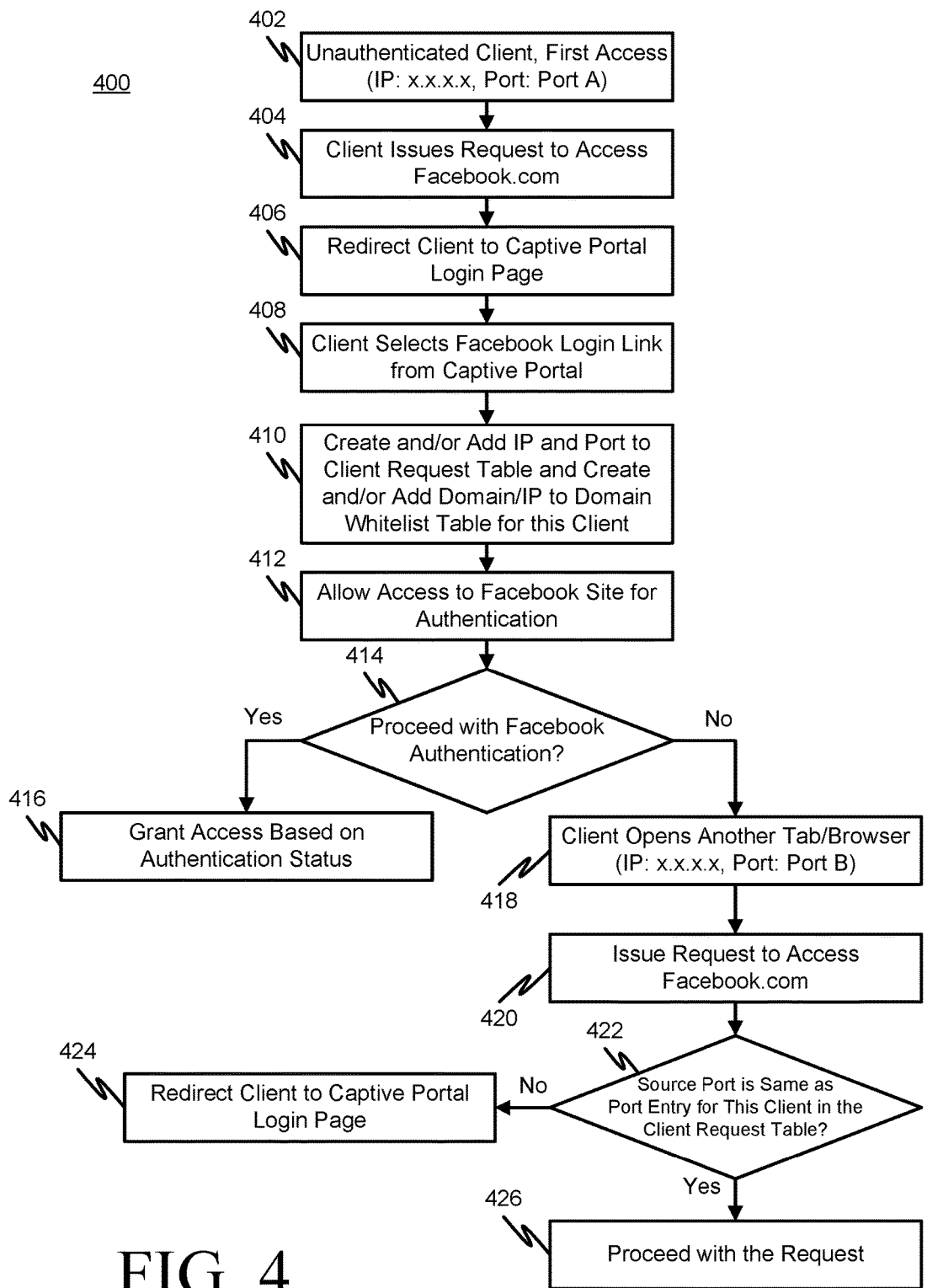
FIG. 4 is a flow chart of an example method of providing a captive portal with dynamic context-based whitelisting in accordance with at least one implementation.

FIG. 4 is a flow chart of an example method 400 for providing a captive portal with dynamic context-based whitelisting in accordance with at least one implementation. Processing begins at 402, where an unauthenticated client (e.g., 116 or 118) first accesses a captive portal (e.g., 102). The access communication from the unauthenticated client (or user device) includes the IP address and port number of the client (e.g., IP: x.x.x.x and Port A). Processing continues to 404.

At 404, the user device issues a request to access a website (e.g., Facebook.com). The request is received and intercepted by the captive portal. Processing continues to 406.

At 406, the user device is redirected to the captive portal login page. The captive portal login page can include one or more user interface elements (links, button, etc.) for connecting to the login in page of a website (e.g., Facebook.com). Processing continues to 408.

At 408, the unauthenticated user clicks on (or otherwise selects) a login element for a website (e.g., Facebook.com). Processing continues to 410.

At 410, a client request table and/or domain whitelist table are created for the user device (if one or both tables do not already exist). For example, an entry in the client request table is dynamically populated when the user clicks the link or user interface element to initiate the process of logging into a website such as a Facebook.com. In some implementations, the entries in the client request table are populated dynamically only when the user initiates the process of social media login, by clicking on the login button on the captive portal login page. This connection can be considered as the authentication flow for social media.

On click of the login button (or other user interface selection), the entry (e.g., client (or user device) IP and client connecting port) is made in the client request table corresponding exclusively to the user device. Also, an entry corresponding to the website is added to the domain whitelist table for the user device. The access to the social media login page is now allowed (412). If the social media login button on the captive portal login page was not pressed then no entry is made in the client request table/domain whitelist table and hence the first firewall logic rule stated above is not evaluated. If the user tries to access the Facebook site without clicking on the login button from the captive portal login page, the request is redirected to the captive portal login page even though internally the Facebook.com domain may be whitelisted. Also, the system may track which whitelisted website the unauthenticated client was trying to access and may block other whitelisted websites from access by the unauthenticated client.

At 414, it is determined whether the user proceeded with website authentication and was successful. If so, processing continues to 416. Otherwise, processing continues to 418.

At 416, the captive portal grants the client access to a network based on the social media login completion and deletes the client request table and the domain whitelist table for the user device.

At 418, the client opens another tab or browser window (e.g., IP address x.x.x.x and Port B). Processing continues to 420.

At 420, the unauthenticated client issues a request to access a website (e.g., Facebook.com). The request is received and intercepted by the captive portal. Processing continues to 422.

At 422, it is determined whether the IP and source port for the second request (e.g., IP: x.x.x.x and Port B) received in 420 matches an entry in the client request table. If so, processing continues to 426. Otherwise, processing continues to 424.

In this example, the second attempt comes from a port that is different from the port of the first access request from the client that was recorded in the Client Request Table (e.g., Port B in the second request at 418 and Port A in the first request at 402), so processing could continue to 424.

At 424, the client is redirected to the captive portal login page.

At 426, the client is permitted to proceed with the access request (e.g., accessing Facebook.com).

It will be appreciated that the dynamic, context-based whitelisting is performed on a per client (or user device) basis (e.g., the captive portal with dynamic context-based whitelisting differentiates between users by context) and is dynamic based on what website a user seeks to access and context-based regarding the IP address and port number a client access request is coming from.

Figure 5:
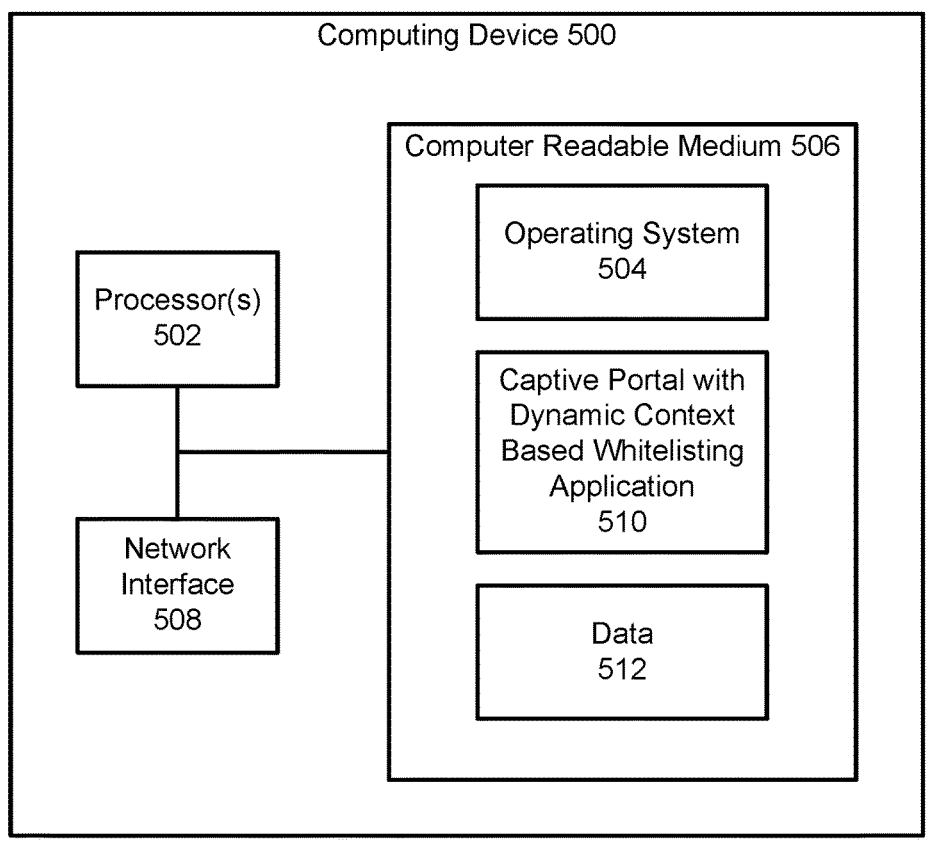
FIG. 5 is a diagram of an example computing device configured for providing a captive portal with dynamic context-based whitelisting in accordance with at least one implementation.

FIG. 5 is a diagram of an example computing device 500 in accordance with at least one implementation. The computing device 500 includes one or more processors 502, nontransitory computer readable medium 506 and network interface 508. The computer readable medium 506 can include an operating system 504, a captive portal application 510 having dynamic, context-based whitelisting capability and a data section 512 (e.g., for storing a client request table, a domain whitelist table, etc.).

In operation, the processor 502 may execute the application 510 stored in the computer readable medium 506. The application 510 can include software instructions that, when executed by the processor, cause the processor to perform operations for a captive portal having dynamic, context-based whitelisting in accordance with the present disclosure (e.g., performing one or more of 402-426 described above).

The application program 510 can operate in conjunction with the data section 512 and the operating system 504.

It will be appreciated that the modules, processes, systems, and sections described above can be implemented in hardware, hardware programmed by software, software instructions stored on a nontransitory computer readable medium or a combination of the above. A system as described above, for example, can include a processor configured to execute a sequence of programmed instructions stored on a nontransitory computer readable medium. For example, the processor can include, but not be limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C, C++, C#.net, assembly or the like. The instructions can also comprise code and data objects provided in accordance with, for example, the Visual Basic™ language, or another structured or object-oriented programming language. The sequence of programmed instructions, or programmable logic device configuration software, and data associated therewith can be stored in a nontransitory computer-readable medium such as a computer memory or storage device which may be any suitable memory apparatus, such as, but not limited to ROM, PROM, EEPROM, RAM, flash memory, disk drive and the like.

Furthermore, the modules, processes systems, and sections can be implemented as a single processor or as a distributed processor. Further, it should be appreciated that the steps mentioned above may be performed on a single or distributed processor (single and/or multi-core, or cloud computing system). Also, the processes, system components, modules, and sub-modules described in the various figures of and for embodiments above may be distributed across multiple computers or systems or may be co-located in a single processor or system. Example structural embodiment alternatives suitable for implementing the modules, sections, systems, means, or processes described herein are provided below.

The modules, processors or systems described above can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and/or a software module or object stored on a computer-readable medium or signal, for example.

Embodiments of the method and system (or their subcomponents or modules), may be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a PLD, PLA, FPGA, PAL, or the like. In general, any processor capable of implementing the functions or steps described herein can be used to implement embodiments of the method, system, or a computer program product (software program stored on a nontransitory computer readable medium).

Furthermore, embodiments of the disclosed method, system, and computer program product (or software instructions stored on a nontransitory computer readable medium) may be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a VLSI design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of the software engineering and computer networking arts.

Moreover, embodiments of the disclosed method, system, and computer readable media (or computer program product) can be implemented in software executed on a programmed general purpose computer, a special purpose computer, a microprocessor, a network server or switch, or the like.

It is, therefore, apparent that there is provided, in accordance with the various embodiments disclosed herein, methods, systems and computer readable media for a captive portal having dynamic, context-based whitelisting.

While the disclosed subject matter has been described in conjunction with a number of embodiments, it is evident that many alternatives, modifications and variations would be, or are, apparent to those of ordinary skill in the applicable arts. Accordingly, Applicants intend to embrace all such alternatives, modifications, equivalents and variations that are within the spirit and scope of the disclosed subject matter.

What is claimed is:

1. A method comprising:
   receiving, from a user device, a first request to access a website;
   redirecting the user device to a captive portal;
   receiving a selection from the user device via the captive portal to access a login page of the web site;
   creating a client request table corresponding exclusively to the user device;
   creating a domain whitelist table corresponding exclusively to the user device;
   adding a client request table entry to the client request table corresponding exclusively to the user device, the client request table entry including an Internet protocol (IP) address and a port number of the user device;
   adding a domain whitelist table entry to the domain whitelist table corresponding exclusively to the user device, the domain whitelist table entry including a domain name of the website and a DNS resolved IP address for the domain name;
   permitting the user device to access the login page of the website based on the domain whitelist table entry;
   receiving a second request from the user device to access the website, the second request including an IP address and a port number;
   searching for the IP address and port number combination of the second request in the client request table corresponding exclusively to the user device;
   when the IP address and port number combination of the second request do not match an existing combination in the client request table, redirecting the user device to the captive portal; and
   when the IP address and port number combination of the second request match a combination existing in the client request table, permitting the user device to access the website via the second request.

2. The method of claim 1, further comprising granting access to a network when the user 14 device completes an authentication process with the website.

3. The method of claim 1, wherein the website is a social media website.

4. The method of claim 1, further comprising deleting the client request table and the domain whitelist table when the user device completes an authentication process with the web site.

5. The method of claim 1, wherein when a selection to login to a second website is received from the user device, adding an entry for the second website to the domain whitelist table corresponding exclusively to the user device.

6. A system comprising:
   one or more processors coupled to a nontransitory computer readable medium having stored thereon software instructions that, when executed by the one or more processors, cause to perform operations including:
   receiving, from a user device, a first request to access a website;
   redirecting the user device to a captive portal;
   receiving a selection from the user device via the captive portal to access a login page of the website;
   creating a client request table corresponding exclusively to the user device;
   creating a domain whitelist table corresponding exclusively to the user device;
   adding a client request table entry to the client request table corresponding exclusively to the user device, the client request table entry including an Internet protocol (IP) address and a port number of the user device;
   adding a domain whitelist table entry to the domain whitelist table corresponding exclusively to the user device, the domain whitelist table entry including a domain name of the website and a DNS resolved IP address for the domain name;

permitting the user device to access the login page of the website based on the domain whitelist table entry;

receiving a second request from the user device to access the website, the second request including an IP address and a port number;

searching for the IP address and port number combination of the second request in the client request table corresponding exclusively to the user device;

when the IP address and port number combination of the second request do not match an existing combination in the client request table, redirecting the user device to the captive portal; and when the IP address and port number combination of the second request match a combination existing in the client request table, permitting the user device to access the website via the second request.

7. The system of claim 6, further comprising granting access to a network when the user device completes an authentication process with the website.

8. The system of claim 6, wherein the website is a social media website.

9. The system of claim 6, further comprising deleting the client request table and the domain whitelist table when the user device completes an authentication process with the web site.

10. The system of claim 6, wherein when a selection to login to a second website is received from the user device, adding an entry for the second website to the domain whitelist table corresponding exclusively to the user device.

11. A nontransitory computer readable medium having stored thereon software instructions that, when executed by one or more processors, cause the one or more processors to:

receiving, from a user device, a first request to access a website;

redirecting the user device to a captive portal;

receiving a selection from the user device via the captive portal to access a login page of the web site;

creating a client request table corresponding exclusively to the user device;

creating a domain whitelist table corresponding exclusively to the user device;

adding a client request table entry to the client request table corresponding exclusively to the user device, the client request table entry including an Internet protocol (IP) address and a port number of the user device;

adding a domain whitelist table entry to the domain whitelist table corresponding exclusively to the user device, the domain whitelist table entry including a domain name of the website and a DNS resolved IP address for the domain name;

permitting the user device to access the login page of the website based on the domain whitelist table entry;

receiving a second request from the user device to access the website, the second request including an IP address and a port number;

searching for the IP address and port number combination of the second request in the client request table corresponding exclusively to the user device;

when the IP address and port number combination of the second request do not match an existing combination in the client request table, redirecting the user device to the captive portal; and when the IP address and port number combination of the second request match a combination existing in the client request table, permitting the user device to access the website via the second request.

12. The nontransitory computer readable medium of claim 11, further comprising granting access to a network when the user device completes an authentication process with the website.

13. The nontransitory computer readable medium of claim 11, wherein the website is a social media website.

14. The nontransitory computer readable medium of claim 11, further comprising deleting the client request table and the domain whitelist table when the user device completes an authentication process with the website.

15. The nontransitory computer readable medium of claim 11, wherein when a selection to login to a second website is received from the user device, adding an entry for the second website to the domain whitelist table corresponding exclusively to the user device.

* * * * *